(12) United States Patent
Onodera

(10) Patent No.: US 6,268,576 B1
(45) Date of Patent: Jul. 31, 2001

(54) SWITCH APPARATUS FOR STEERING WHEEL

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/607,083

(22) Filed: Jun. 28, 2000

(30) Foreign Application Priority Data

Jul. 1, 1999 (JP) .................................................. 11-188187

(51) Int. Cl.[7] ...................................................... H01H 9/00
(52) U.S. Cl. ........................................................ 200/61.54
(58) Field of Search ................. 200/61.27, 61.54–61.57; 307/9.1, 10.1, 10.8, 38

(56) References Cited

U.S. PATENT DOCUMENTS

| | | | | |
|---|---|---|---|---|
| 4,518,836 | * | 5/1985 | Wooldridge | 200/61.54 |
| 5,365,803 | * | 11/1994 | Kelley et al. | 74/484 R |
| 5,520,066 | * | 5/1996 | Tueri | 74/484 R |
| 5,569,893 | * | 10/1996 | Seymour | 200/61.54 |
| 5,756,950 | * | 5/1998 | De Filippo | 200/61.54 |
| 5,855,144 | * | 1/1999 | Parada | 74/552 |
| 5,949,149 | | 9/1999 | Shitanaka et al. | 307/10.1 |

* cited by examiner

*Primary Examiner*—Michael Friedhofer
(74) *Attorney, Agent, or Firm*—Brinks Hofer Gilson & Lione

(57) ABSTRACT

The switch apparatus for the steering wheel is constructed such that a switch body section is mounted within a pad section of a steering wheel, an operating section for driving the switch body section is caused to protrude outwardly of the pad section, and it is made possible to operate the operating section from two directions in such a manner that the same switch signal can be outputted in the operation from either direction.

6 Claims, 4 Drawing Sheets

SWITCH APPARATUS FOR STEERING WHEEL

BACKGROUND OF THE INVENTION

1. Detailed Description of the Invention

The present invention relates to a switch apparatus for a steering wheel, and more particularly to a switch apparatus for a steering wheel for switching an electrical apparatus or the like to be used for an automobile.

2. Description of the Prior Art

With reference to the drawings, the description will be made of a conventional switch apparatus for a steering wheel.

FIG. 5 is a plan view showing the conventional switch apparatus for the steering wheel, and FIG. 6 is a partial enlarged sectional view taken on line 6—6 of FIG. 5.

As shown in FIGS. 5 and 6, a steering wheel 10 is generally constructed of: a substantially annular ring section 1; a pad section 3 disposed in the central portion of the ring section 1; and a spoke section 2 for connecting the ring section 1 to the pad section 3.

This steering wheel 10 is rotatively connected to a vehicle body through a steering shaft (not shown).

In other words, the vehicle body is capable of being turned to the right or the left by operating the steering wheel 10.

On the surface of the pad section 3, a plurality of (for example, two) recesses 3a are provided near the ring section 1. On the bottom wall of the recess 3a, there is provided a rectangular hole 3b respectively. These holes 3b are provided at positions respectively where they are axial symmetrical about the center line of the steering wheel 10.

Within the pad section 3, a switch apparatus 4 having an operating section 4a is disposed by appropriate means in a state connected to a printed circuit board 5. At this time, the operating section 4a of the switch apparatus 4 is disposed such that it protrudes from the hole 3b of the recess 3a outwardly and that the top surface of the operating section 4a is substantially flush with that of the pad section 3.

This switch apparatus 4 is constructed such that when the operating section 4a is depressed (in a direction indicated by an arrow G), the switch apparatus 4 is turned ON, and when the depression of the operating section 4a is stopped, the operating section 4a automatically returns to the original position to turn OFF.

Next, the description will be made of an operation of the switch apparatus for the steering wheel.

First, when an operator (for example, driver of the vehicle) depresses the operating section 4a of the switch apparatus 4 with, for example, his or her thumb with the ring section 1 of the steering wheel 10 grasped by hands, the switch apparatus 4 is turned ON, and when the depression of the operating section 4a with the thumb is stopped, it is turned OFF.

By such an operation, the switch apparatus 4 is turned ON or OFF, and for example, selected station for a radio receiver, setting of auto-cruising, muting of an acoustic apparatus and the like can be switched.

In the conventional switch apparatus for the steering wheel, however, since the ON-OFF operation of the switch apparatus 4 is performed only by depressing the operating section 4a, the switch apparatus 4 is to be operated by the thumb in a state in which the ring section 1 is grasped by hands, and accordingly, there is no degree of freedom, but there arises demand to increase the degree of freedom in view of operation.

SUMMARY OF THE INVENTION

In view of the foregoing, a principal object of the present invention is to provide a switch apparatus for the steering wheel having a degree of freedom in view of operation of the switch apparatus and easy to operate.

The switch apparatus for the steering wheel according to the present invention is constructed such that a switch body section is mounted onto a steering wheel having a ring section, a pad section and a spoke section, an operating section for driving the switch body section is caused to protrude into space surrounded by the ring section, the pad section and the spoke section of the steering wheel, and it is made possible to operate the operating section from two directions, in such a manner that the same switch signal can be outputted in the operation from either direction.

The switch apparatus for the steering wheel according to the present invention is constructed such that a first end section of the operating section is caused to protrude into a space section between the ring section and the pad section of the steering wheel in such a manner that the first end section can be operated by fingers with the ring section grasped by hands.

The switch apparatus for the steering wheel according to the present invention is constructed such that a switch body section is mounted within the pad section of the steering wheel, an operating section for driving the switch body section is caused to protrude outwardly of the pad section, and it is made possible to operate the operating section from two directions in such a manner that the same switch signal can be outputted in the operation from either direction.

The switch apparatus for the steering wheel according to the present invention is constructed such that a switch body section is mounted within the spoke section of the steering wheel, an operating section for driving the switch body section is caused to protrude outwardly of the spoke section, and it is made possible to operate the operating section from two directions in such a manner that the same switch signal can be outputted in the operation from either direction.

The switch apparatus for the steering wheel according to the present invention is constructed such that a first end section of the operating section is caused to protrude into a space section between the ring section and the spoke section of the steering wheel in such a manner that the first end section can be operated by fingers with the ring section grasped by hands.

DETAILED DESCRIPTION OF THE PREFERRED EMBODIMENTS

[Embodiments of the Invention]

Hereinafter, with reference to the drawings, the description will be made of a switch apparatus of a steering wheel according to the present invention.

Figure 1:
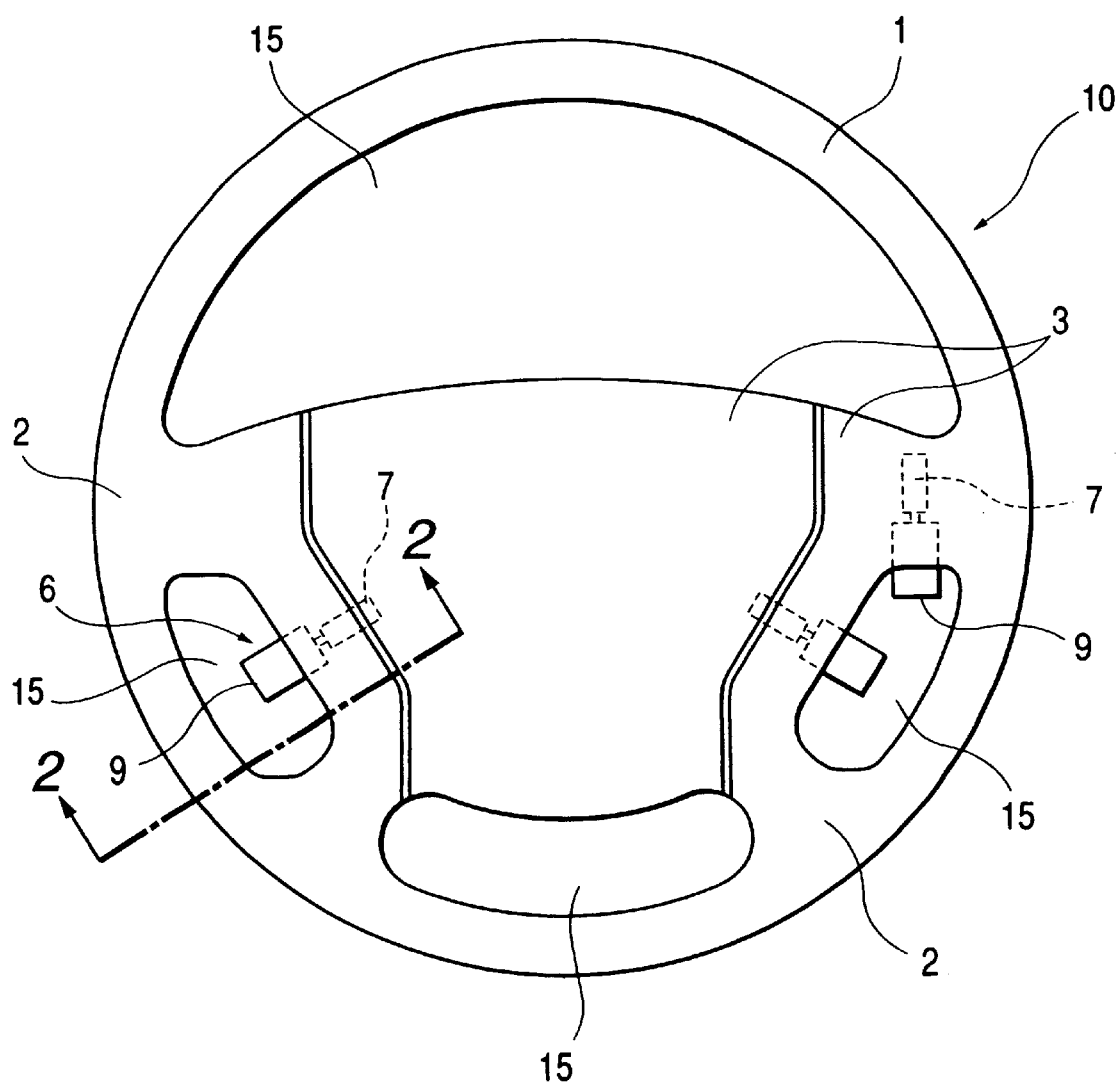
FIG. 1 is a plan view showing a switch apparatus for a steering wheel according to an embodiment of the present invention.
Figure 2:
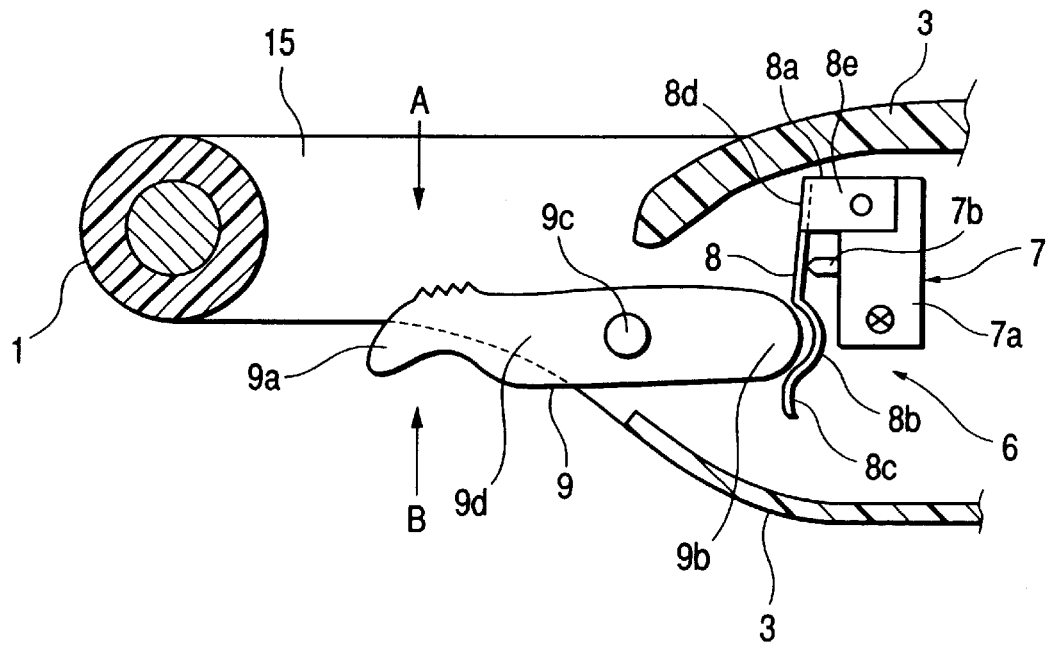
FIG. 2 is a partial enlarged sectional view taken on line 2—2 of FIG. 1.
Figure 3:
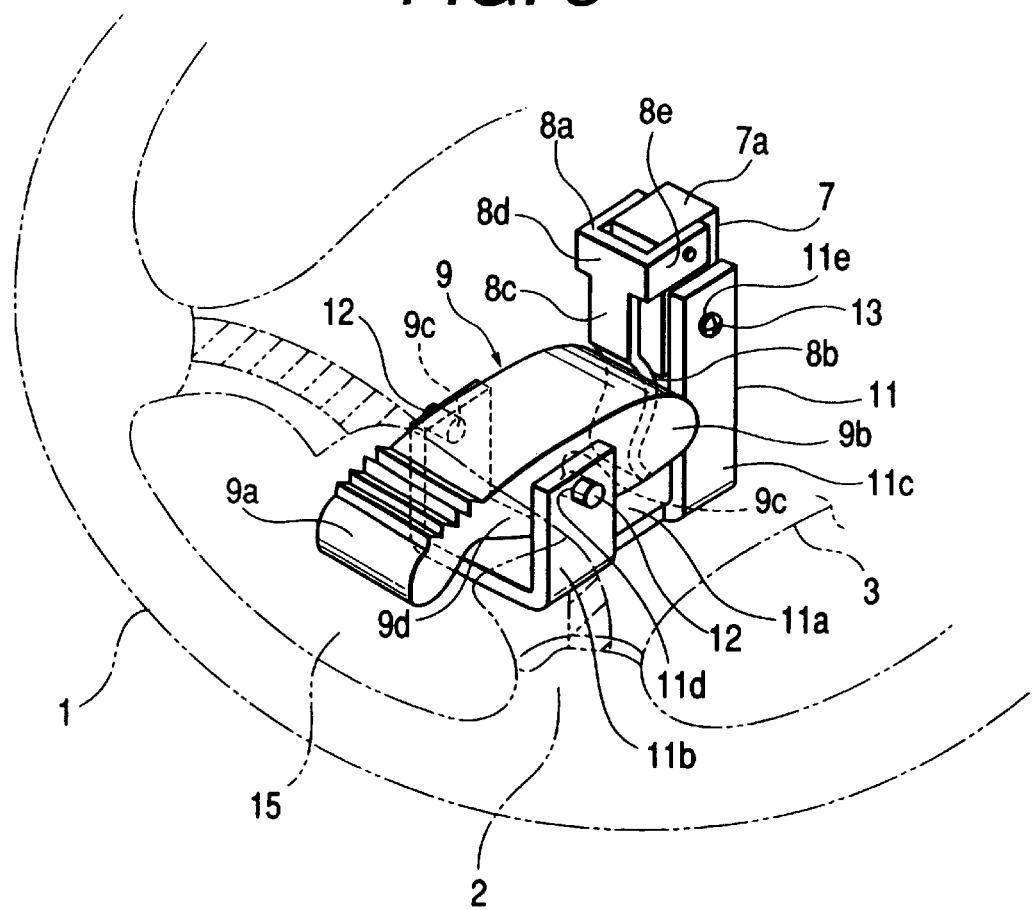
FIG. 3 is a partial perspective view showing the switch apparatus for the steering wheel according to the embodiment of the present invention.

FIG. 1 is a plan view showing a switch apparatus for a steering wheel according to an embodiment of the present invention, FIG. 2 is a partial enlarged sectional view taken on line 2—2 of FIG. 1 and FIG. 3 is a partial perspective view showing the switch apparatus for the steering wheel according to the embodiment of the present invention.

In this respect, sections identical to those in the conventional switch apparatus for the steering wheel are designated by the identical reference numerals.

As shown in FIGS. 1 to 3, a steering wheel 10 is generally constructed of: a substantially annular ring section 1; a pad section 3 disposed in the central portion of the ring section 1; and a spoke section 2 for connecting the ring section 1 to the pad section 3. Also, the steering wheel 10 is provided with: a plurality of (for example, four) space sections 15, the circumference of which is surrounded by the ring section 1, the spoke section 2 and the pad section 3.

This steering wheel 10 is rotatively connected to a vehicle body through a steering shaft (not shown).

In other words, the vehicle body is capable of being turned to the right or the left by operating the steering wheel 10.

The pad section 3 has also a switch apparatus 6 housed and mounted on the side of the inner surface of the pad section 3.

A description will be made of the switch apparatus 6.

The switch apparatus 6 is provided with: a switch body section 7 such as a microswitch element; a lever section 8 for bringing a movable contact (not shown) and a stationary contact (not shown) within the switch body section 7 into and out of contact with each other; and an operating section 9 for driving the lever section 8.

The switch body section 7 has: a substantially box-shaped enclosure section 7a obtained by fabrication; a drive section 7b protruding from the enclosure section 7a outwardly; and a movable contact (not shown) to be driven by the drive section 7b, disposed within the enclosure section 7a. Also, a stationary contact (not shown) opposed to the movable contact (not shown), for being brought into and out of contact with the movable contact is disposed within the enclosure section 7a, and there are provided terminals (not shown) connected to the movable contact and the stationary contact.

The lever section 8 is made of a metallic flat plate, is obtained by bending and cutting off, and is provided with: a U-shaped holding section 8a equipped with a rectangular proximal section 8d and a pair of arm sections 8e; and an actuating section 8c extendedly provided from the proximal section 8d of the holding section 8a on the same plane outwardly. In the central portion of the actuating section 8c, there is provided a curved-surface section 8b bent on the arm section 8e side. Also, the arm section 8e of the holding section 8a is rockably engaged with the side wall of the enclosure section 7a of the switch body section 7 by appropriate means (for example, screws or caulking), and in this state, one surface (rear surface) of the actuating section 8c abuts upon the drive section 7b.

For this reason, the rocking of the lever section 8 drives the drive section 7b back and forth to thereby cause the movable contact and the stationary contact to be brought into and out of contact with each other.

The operating section 9 has a substantially flat plate shape having a predetermined slightly thicker thickness dimension, made of synthetic resin material, obtained by fabrication, and is provided with: a first end section 9a provided at one end section for operating in two directions (pushing and pulling); a curved surface-shaped second end section 9b provided at the other end section; and a pair of circular, recesses 9c provided on the opposed sides 9d near the second end section 9b.

As shown in FIG. 3, a holding member 11 is made of a metallic flat plate, is obtained by bending and cutting off, and is provided with: a substantially flat plate-shaped substrate section 11a; a pair of first arm sections 11b provided to be orthogonal to one end section of the substrate section 11a; and one second arm section 11c provided at the other end section in the same direction as the first arm sections 11b. The first arm section 11b is formed with a pair of opposed circular holes 11d, and the second arm section 11c is formed with a circular mounting hole 11e.

A cylindrical column-shaped engaging pins 12 are inserted into the pair of holes 11d of the holding member 11, and one end section of the engaging pin 12 is disposed within a recess 9c of the operating section 9. In this manner, the operating section 9 is held between the pair of first arm sections 11b with the engaging pins 12 and is rockably held by the holding member 11. An enclosure section 7a of the switch body section 7 is mounted to a mounting hole 11e of the second arm section 11c of the holding member 11 by appropriate means such as a screw 13. The switch body section 7 is mounted to the second arm section 11c, and at this time, is disposed close to the substrate section 11a with the other surface of the lever section 8 facing the first arm section 11b side.

Also, in this state, the curved surface section 8b of the lever section 8 and the second end section 9b of the operating section 9 are disposed close to each other, or to abut upon or oppose to each other.

The holding member 11 is housed and disposed on the side of the inner surface of the pad section 3 of the steering wheel 10, and is mounted to the pad section 3 by appropriate means (such as a screw).

The first end section 9a of the operating section 9 is disposed so as to protrude into the space section 15 (See FIG. 1) surrounded by the ring section 1, the spoke section 2 and the pad section 3. At this time, space sections 15, include on the lateral sides which, when the driver grasps the ring section 1 for operation, he or she puts the hands on (grasps) most frequently, and space sections 15 which are provided to oppose to each other in positions axial-symmetrical with respect to the ring section 1.

Next, a description will be made of an operation of the switch apparatus for the steering wheel.

First, when pushing pressure (force in a direction indicated by an arrow A) is applied to the first end section 9a of the operating section 9 protruding into the space section 15 surrounded by the ring section 1 and the pad section 3 of the steering wheel 10, the first end section 9a for pushing and pulling is pressed down with each engaging pin 12 inserted into the pair of recesses 9c of the operating section 9 as a support. On the other hand, the second end section 9b of the operating section 9 is pressed up, and when this second end section 9b is pressed up, the second end section 9b abuts upon one end section (upper side) of the curved surface section 8b of the lever section 8 to thereby press the lever section 8 on the switch body section 7 side.

The lever section 8 thus pressed drives the drive section 7b of the switch body section 7 so that the movable contact comes into contact with the stationary contact to turn ON the switch. When the pressing pressure to the first end section 9a is released from this state, a return force (automatic returning force) of the drive section 7b presses back the lever section 8 so that the second end section 9b is driven along the curved surface section 8b, and the first end section 9a operates to return to the original position in sequence reverse to the foregoing.

Next, when pulling pressure (force in a direction indicated by an arrow B) is applied to the first end section 9a, the first end section 9a of the operating section 9 is pulled up with each engaging pin 12 as the support. On the other hand, the second end section 9b of the operating section 9 is pressed down, and when the second end section 9b is pressed down, the second end section 9b abuts upon the other end (lower side) of the curved surface section 8b of the lever section 8 to thereby press the lever section 8 on the switch body section 7 side. Thereafter, the switch apparatus operates in the same manner as described above, and the switch is turned ON. When the pulling pressure of the first end section 9a is released from this state, the return force (automatic returning force) of the drive section 7b presses back the lever section 8, and the first end section 9a operates to return to the original position in sequence reverse to the foregoing.

Next, with reference to the drawings, a description will be made of the switch apparatus for the steering wheel according to the second embodiment of the present invention.

Figure 4:
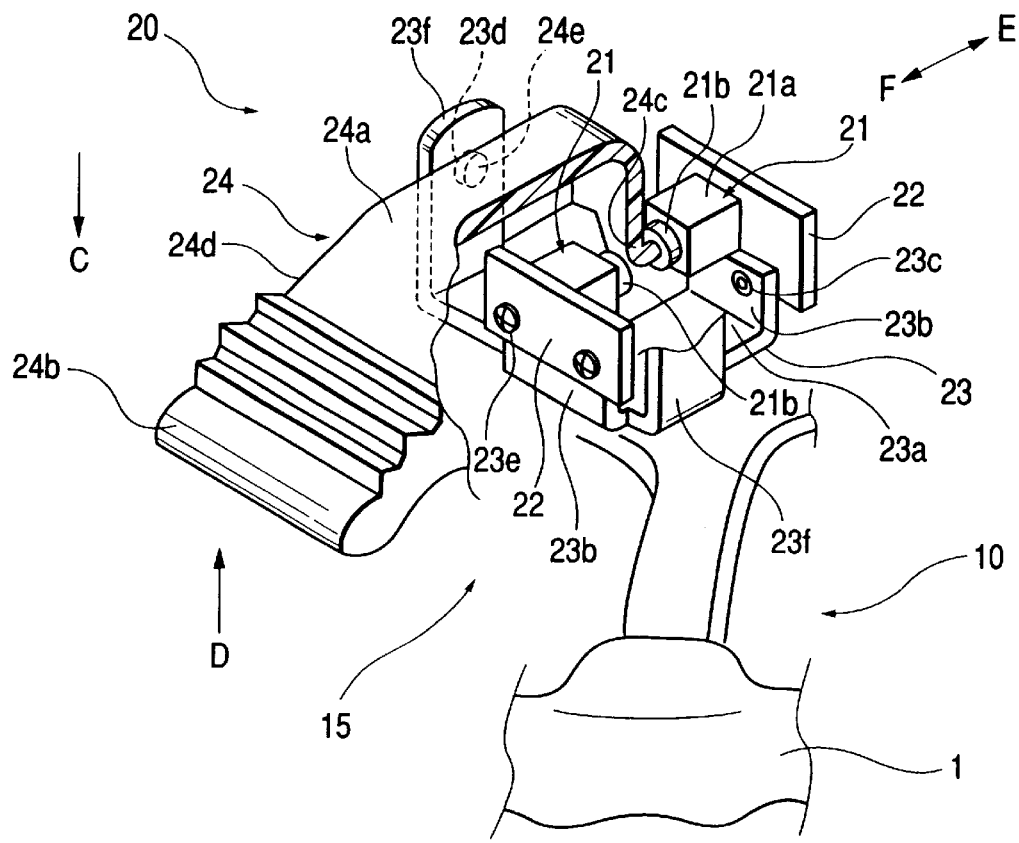
FIG. 4 is a partial enlarged perspective view showing a switch apparatus for a steering wheel according to a second embodiment of the present invention.
Figure 6:
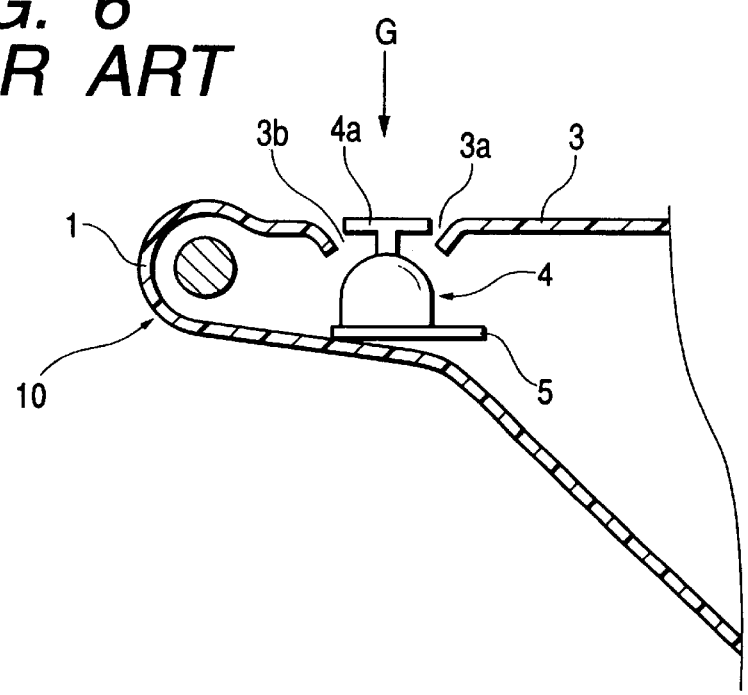
FIG. 6 is a partial enlarged sectional view taken on line 6—6 of FIG. 5.
Figure 5:
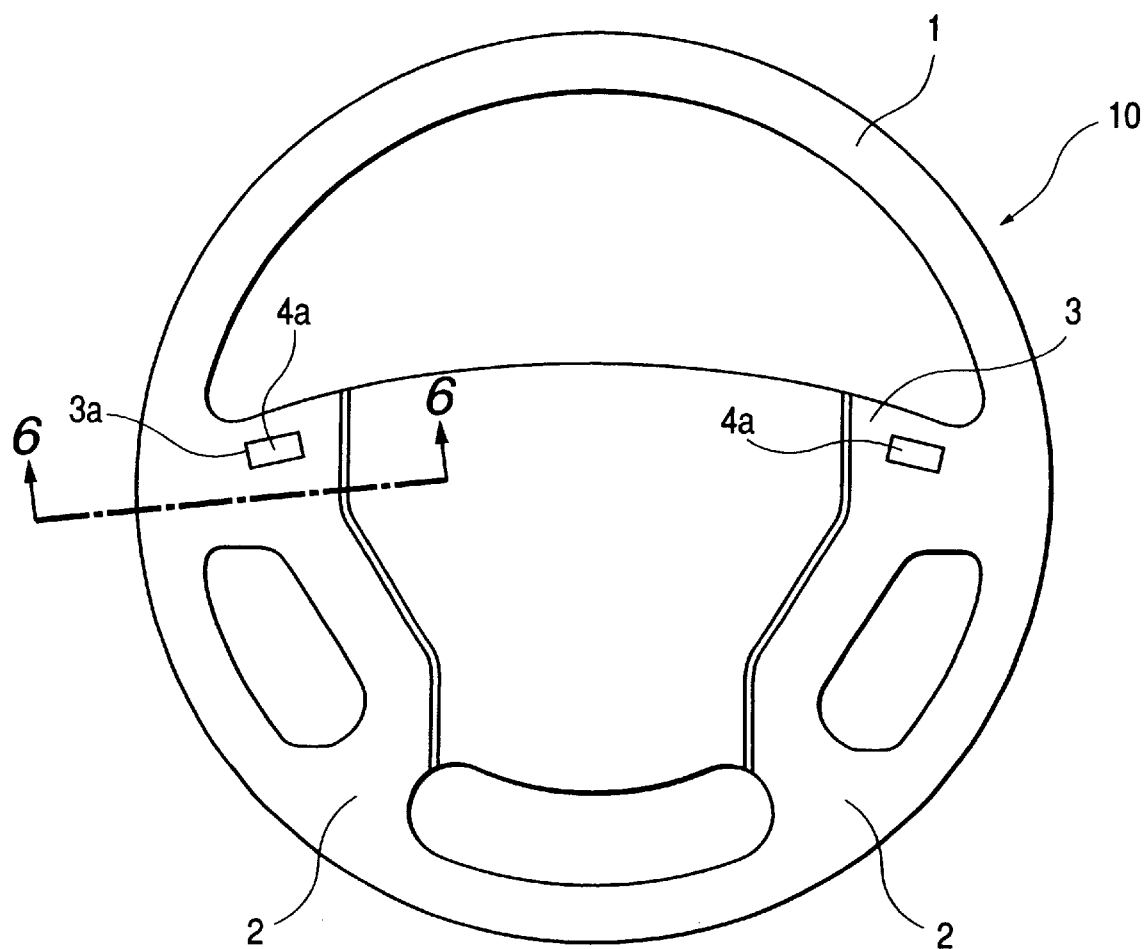
FIG. 5 is a plan view showing a conventional switch apparatus for a steering wheel.

FIG. 4 is a partial enlarged perspective view showing the switch apparatus for the steering wheel according to the second embodiment of the present invention.

As shown in FIG. 4, this switch apparatus 20 is generally constructed by: a pair of switch body sections 21 and 21; a printed circuit board 22 to which the switch body section 21 is connected; a holding member 23 for holding the printed circuit board 22; and an operating section 24 for operating the pair of switch body sections 21 and 21.

The switch body section 21 has: a substantially box-shaped enclosure section 21a obtained by fabrication; a drive section 21b for protruding from the enclosure section 21a outwardly; and a movable contact (not shown) to be driven by the drive section 21b, disposed within the enclosure section 21a. Also, there is disposed, within the enclosure section 21a, a stationary contact (not shown) which opposes to the movable contact (not shown) and is brought into and out of contact with the movable contact. In addition, on the bottom wall of the enclosure section 21a, there are disposed terminals (not shown) connected to the movable and stationary contacts respectively.

The printed circuit board 22 is flat plate-shaped, has a predetermined circuit pattern (not shown) formed on at least one surface thereof, this circuit pattern and terminals of the switch body section 21 are connected by, for example, soldering, and the switch body section 21 is disposed on the printed circuit board 22. Each terminal of the pair of switch body sections 21 and 21 is connected in parallel. This parallel connection enables the same ON-signal to be outputted even when either of the switch body sections 21 and 21 is turned ON.

The holding member 23 is made of metallic flat plate material, is obtained by cutting and bending, and has: a flat plate-shaped, rectangular proximal section 23a; mutually-opposed first arm sections 23b and 23b extendedly provided substantially perpendicularly from first opposed end surfaces of the proximal section 23a; and mutually-opposed second arm sections 23f extendedly provided from second opposed end surfaces in the same direction as the first arm sections 23b. The first arm section 23b is formed with a plurality of (for example, four) threaded holes 23c, and the second arm section 23f is formed with a circular through-hole 23d. The printed circuit board 22 is mounted to the first arm section 23b with screws 23e. In this state, the drive sections 21b and 21b for the switch body sections 21 and 21 are disposed to oppose to each other with a predetermined gap interposed therebetween.

The operating section 24 is substantially L-shaped in entire shape, made of synthetic resin material, obtained by fabrication, and is provided with: a proximal section 24a; a first end section 24b to be pressed and pulled, provided on one end section of the proximal section 24a; a second end section 24c provided on the other end section of the proximal section 24a; and a pair of cylindrical column-shaped protrusions 24e protruding from a side wall 24d of the proximal section 24a outwardly.

The protrusion 24e of the operating section 24 is inserted into the through-hole 23d in the second arm section 23f, whereby the operating section 24 is constructed so as to be able to rock with the protrusion 24e as the support. In this state, the second end section 24c is interposed between drive sections 21b and 21b for the switch body sections 21 and 21.

The holding member 23 is housed and disposed on the side of the inner surface of the pad section 3 of the steering wheel 10, and is mounted to the pad section 3 by appropriate means (such as a screw).

In this state, the first end section 24b of the operating section 24 is disposed so as to protrude into the space section 15 surrounded by the ring section 1, the spoke section 2 and the pad section 3. At this time, space sections include 15 on the lateral sides which, when the driver grasps the ring section 1 for operation, he or she puts the hands on (grasp) most frequently, and which are provided to oppose to each other in positions axial-symmetrical with respect to the ring section 1.

Next, a description will be made of an operation of the switch apparatus for the steering wheel.

First, when pushing pressure (force in a direction indicated by an arrow C) is applied to the first end section 24b of the operating section 24 protruding into the space section 15 surrounded by the ring section 1 and the pad section 3 of the steering wheel 10, the first end section 24b of the operating section 24 is pressed down with the pair of protrusions 24e as a support. On the other hand, the second end section 24c of the operating section 24 is pressed up with the pair of protrusions 24e as the support, and when this second end section 24c is pressed up, the drive section 21b of one (outside the operating section) switch body section 21 is driven (pressed in: a direction indicated by an arrow E), and this switch body section 21 is turned ON.

Next, when the pushing pressure to the first end section 24b is released, the resiliency of the drive section 21b automatically returns the second end section 24c to the original position, and accordingly, the first end section 24b also automatically returns to the original position. At this time, this switch body section 21 is turned OFF.

When pulling pressure (force in a direction indicated by an arrow D) is applied to the first end section 24b, the first end section 24b of the operating section 24 is pulled up with the pair of protrusions 24e as the support. On the other hand, the second end section 24c of the operating section 24 is pressed down with the pair of protrusions 24e as the support, and when the second end section 24c is pressed down, the drive section 21b for the other (inside the operating section) switch body section 21 is driven (pressed in: in a direction indicated an arrow F), and accordingly, the other switch body section 21 is turned ON.

When the pulling pressure of the first end section 24b is released, the first end section 24b returns to the original position in the reverse sequence in the same manner as described above, and accordingly, the other switch body section 21 is turned OFF.

As described above, by the pressing or pulling operation to the first end section 24b of the operating section 24, either of the pair of switch body sections 21 and 21 connected in parallel operates to turn ON in either operation.

In this respect, in the above-described first and second embodiments, the switch apparatus has been disposed in the pad section. However, the present invention is not limited thereto, and it is possible to dispose the switch apparatus in the spoke section and to protrude the operating section into space surrounded by the ring section, the pad section and the spoke section.

As described above, the switch apparatus for the steering wheel according to the present invention is constructed such that it has an operating section for driving the switch apparatus and that the operating section inputs a switch signal by pressing and pulling operations. As regards pushing operation or pulling operation, the switch apparatus can be operated by any movement which the operator (driver) finds easy to operate such that the pressing operation is performed with the thumb and the pulling operation is performed with the forefinger, and therefore, the degree of freedom in view of operation is increased and the switch input can be performed by an easy operation.

Also, since the operation for pressing or pulling the first end section of the operating section can be performed with fingers of hands for grasping the ring section, the switch input can be performed without releasing his or her hand off the ring section during driving, thus further increasing the reliability in the steering operation.

What is claimed is:

1. A switch apparatus for a steering wheel, comprising the steering wheel having a ring section, a pad section and a spoke section, and a switch body section mounted onto the steering wheel, the switch body section having an operating section to drive the switch body section protruding into a space surrounded by the ring section, the pad section and the spoke section of the steering wheel, said operating section operable by movement in two directions, such that a same switch signal is outputted when the operation section is operatively moved in either of the directions.

2. A switch apparatus for a steering wheel according to claim 1, the operating section comprising a first end section protruding into a space section between the ring section and the pad section of the steering wheel such that the first end section is operable by fingers with the ring section grasped by hands.

3. A switch apparatus for a steering wheel, comprising the steering wheel having a pad section and a switch body section mounted within the pad section of the steering wheel, wherein an operating section to drive the switch body section protrudes outwardly of the pad section, and said operating section is operable by movement in two directions such that a same switch signal is outputted when the operating section is operatively moved in either of the directions.

4. A switch apparatus for a steering wheel according to claim 3, wherein a first end section of the operating section protrudes into a space section between a ring section and the pad section of the steering wheel such that the first end section is operable by fingers with the ring section grasped by hands.

5. A switch apparatus for a steering wheel, comprising the steering wheel and a switch body section mounted within a spoke section of the steering wheel, wherein an operating section to drive the switch body section protrudes outwardly of the spoke section, and said operating section is operable by movement in two directions such that a same switch signal is outputted by operatively moving the operating section in either of the directions.

6. A switch apparatus for a steering wheel according to claim 5, wherein a first end section of the operating section protrudes into a space section between a ring section and the spoke section of the steering wheel such that the first end section is operable by fingers with the ring section grasped by hands.

* * * * *